No. 678,949. Patented July 23, 1901.
F. E. FAY.
MACHINE FOR IRONING EDGES OF COLLARS AND CUFFS OR OTHER STARCHED ARTICLES.
(Application filed Dec. 14, 1897.)
(No Model.) 4 Sheets—Sheet 1.
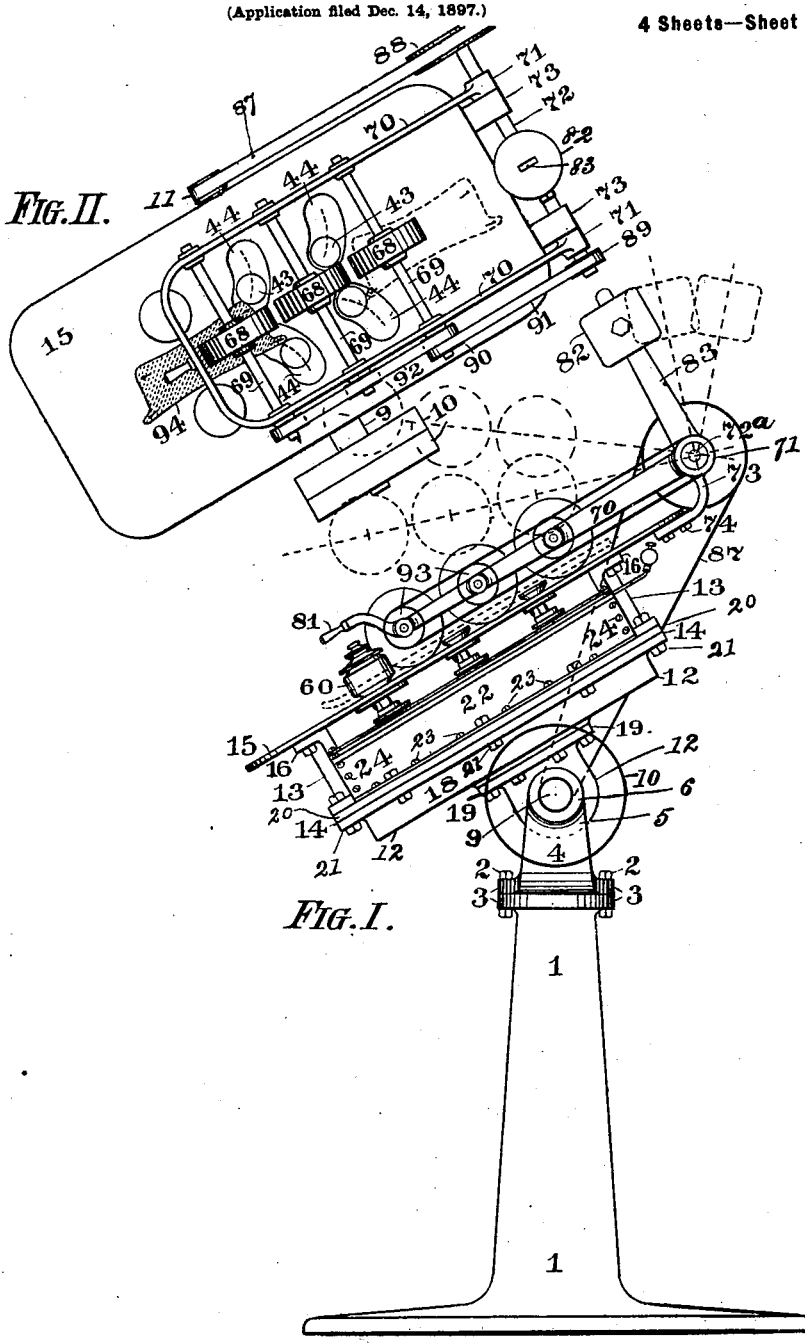
WITNESSES
INVENTOR
Fred E. Fay
BY
ATTORNEYS No. 678,949. Patented July 23, 1901.
F. E. FAY.
MACHINE FOR IRONING EDGES OF COLLARS AND CUFFS OR OTHER STARCHED ARTICLES.
(Application filed Dec. 14, 1897.)
(No Model.) 4 Sheets—Sheet 2.
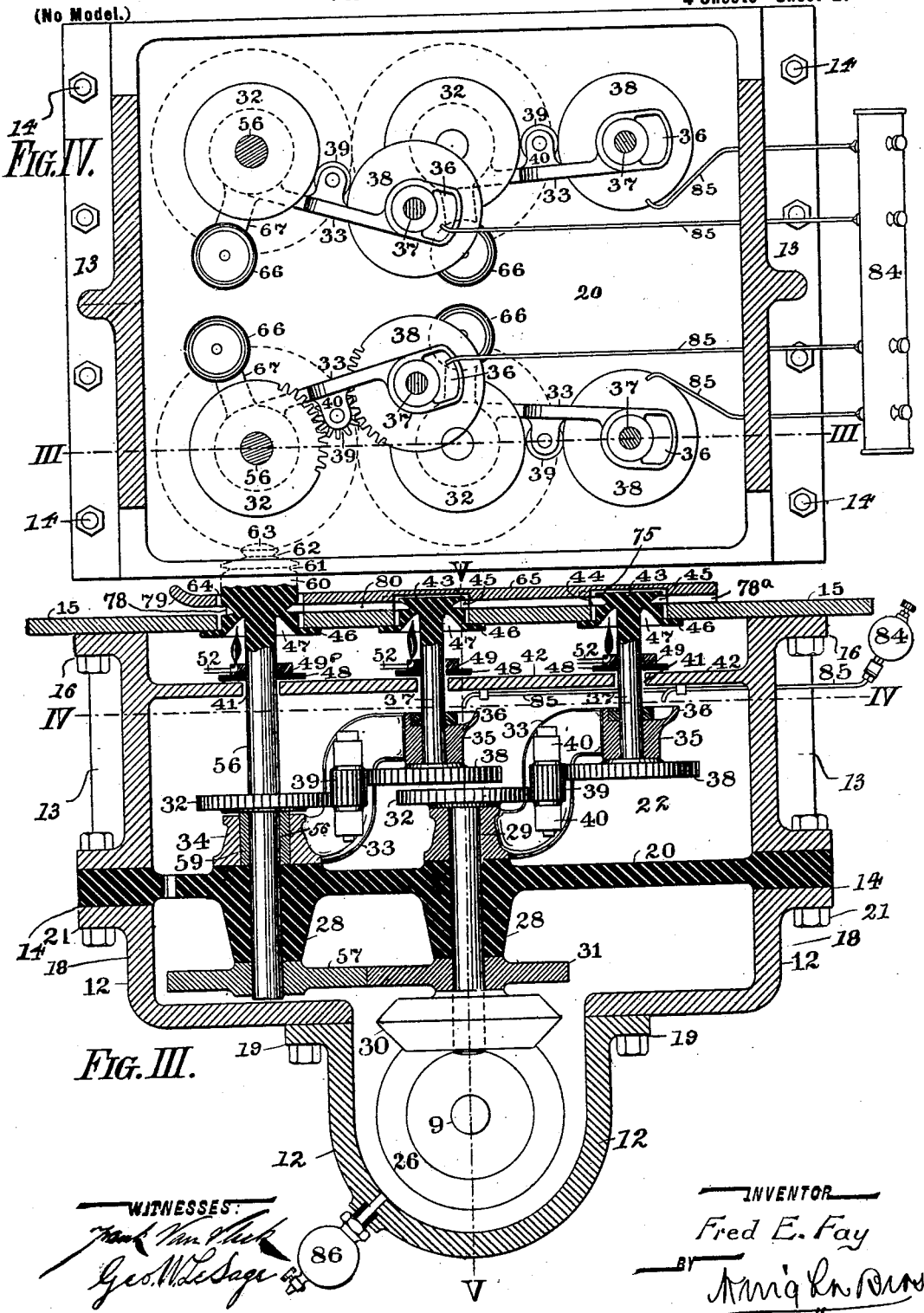
FIG. IV.
FIG. III.
WITNESSES:
INVENTOR
Fred E. Fay
BY
ATTORNEYS

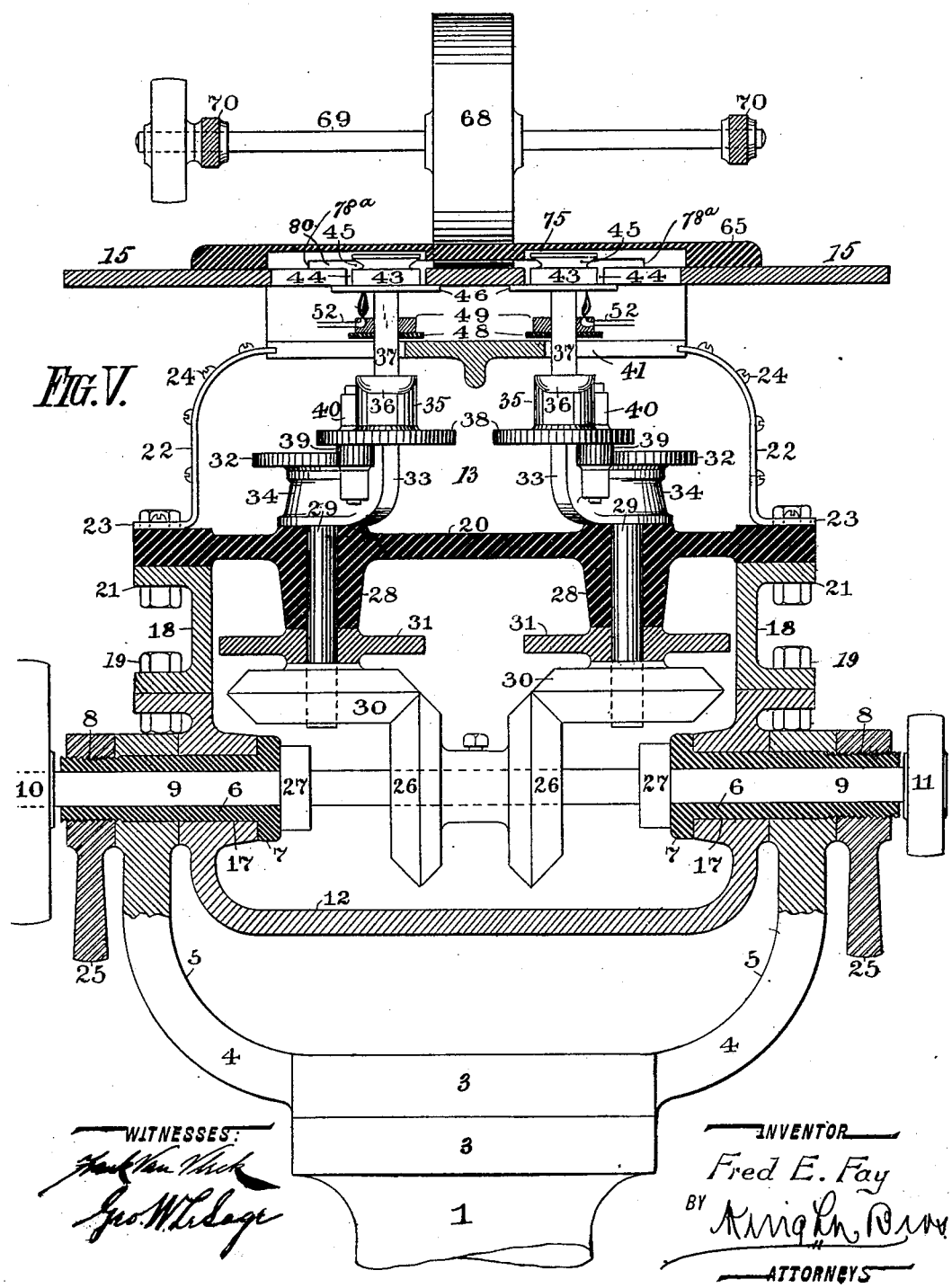

No. 678,949. Patented July 23, 1901.
F. E. FAY.
MACHINE FOR IRONING EDGES OF COLLARS AND CUFFS OR OTHER STARCHED ARTICLES.
(Application filed Dec. 14, 1897.)
(No Model.) 4 Sheets—Sheet 4.
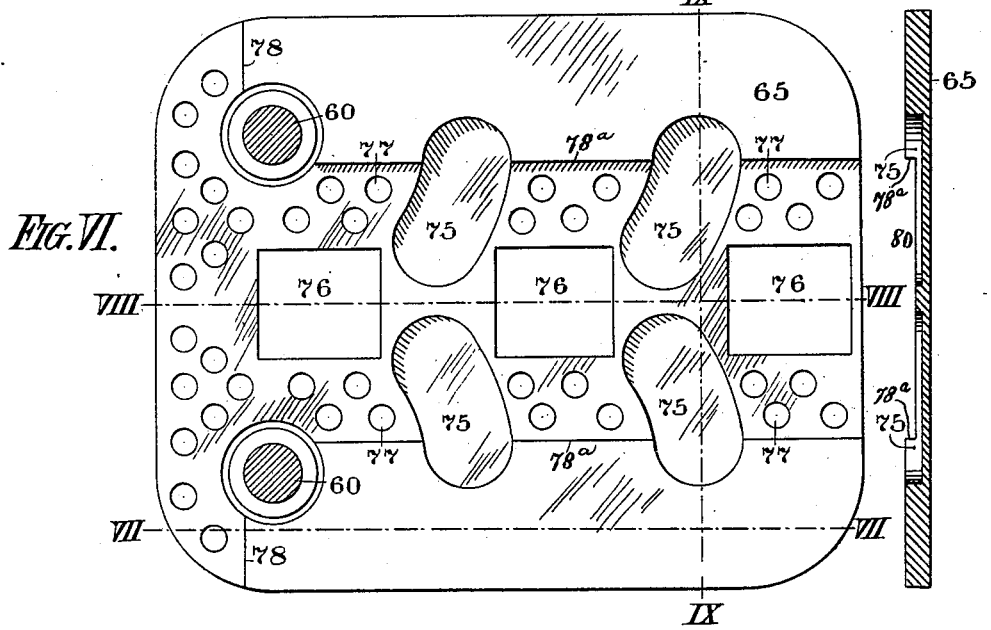
WITNESSES
INVENTOR
Fred E. Fay
BY
ATTORNEYS

UNITED STATES PATENT OFFICE.

FRED E. FAY, OF LOS ANGELES, CALIFORNIA.

MACHINE FOR IRONING EDGES OF COLLARS AND CUFFS OR OTHER STARCHED ARTICLES.

SPECIFICATION forming part of Letters Patent No. 678,949, dated July 23, 1901.

Application filed December 14, 1897. Serial No. 661,813. (No model.)

*To all whom it may concern:*

Be it known that I, FRED E. FAY, a citizen of the United States, residing at Los Angeles, in the county of Los Angeles and State of California, have invented certain new and useful Improvements in Machines for Ironing the Edges of Collars and Cuffs or other Starched Articles, of which the following is a full, clear, and exact description, reference being had to the accompanying drawings, which form a part of this specification.

My invention relates to an improved machine intended more especially for ironing the edges of collars and cuffs after the bodies of the articles have been ironed; but the machine is also applicable for ironing the edges of any starched article; and my invention consists in certain features of novelty hereinafter described and claimed.

Figure I is a side elevation of my improved machine, the guide-plate and different positions of the feed-roller frame being indicated in dotted lines. Fig. II is a top view, the guide-plate being omitted. Fig. III is a vertical section taken on line III III, Fig. IV. Fig. IV is a transverse section taken on line IV IV, Fig. III. Fig. V is a vertical section taken on line V V, Fig. III. Fig. VI is a bottom view of the guide-plate. Fig. VII is an inverted longitudinal sectional view of the guide-plate, taken on line VII VII, Fig. VI. Fig. VIII is a central longitudinal inverted view of the guide-plate, taken on line VIII VIII, Fig. VI. Fig. IX is a transverse sectional view of the guide-plate, taken on line IX IX, Fig. VI. Fig. X is a vertical sectional view of one of the movable ironing-heads, showing burner connection therewith.

Referring to the drawings, 1 represents a pedestal or stand for supporting the operating parts of my improved machine, said stand preferably being made in sections secured to each other by bolts 2 passing through flanges 3 in the stand. The upper section 4 of the stand is made in fork or stirrup form having arms 5, which support the operating parts of the machine.

6 represents sleeves mounted in the upper ends of the arms 5, said sleeves 6 having collars 7 on their inner ends and having their outer ends screw-threaded, as shown at 8.

9 represents a power-shaft which passes through the sleeves 6 and has pulleys 10 11 on its respective ends.

12 represents a box inclosing the principal portion of the operating mechanism and acting as a receptacle for holding the oil or lubricant applied to the gears and shafting.

13 represents castings at the respective ends of the box 12, said castings being bolted to the box 12 at 14 and having an operating-table 15 bolted to their upper ends, as shown at 16. The box 12 is made in suitable sections, the lower one being journaled at 17 on the sleeves 6, which surround the operating-shaft 9.

18 represents a side section of the inclosing box bolted to the bottom section at 19.

20 represents a transversely - extending casting or frame having its outer ends bolted at 21 to the section 18 of the box.

22 represents side plates for inclosing portions of the mechanism, said side plates being secured at 23 to the inclosing box and also connected by screws 24 to the end of the castings 13, said plates 22 being readily removable to give access to the interior of the box in order to regulate and inspect the operating parts. As the box 12 is pivoted on the sleeves 6, which in turn are mounted on the operating-shaft 9, it will readily be seen that the inclosing box may be adjusted to any angle desired—such, for instance, as the angle shown in Fig. I.

25 represents clamps, each having a suitable handle and a collar with an internal screw-thread, said clamps operating on the threaded ends 8 of the sleeves 6. Thus by adjusting said clamps inward the sleeves 6 may be drawn endwise and clamp the box 12 between the collars at the inner ends of the sleeves and the supporting-arms 5.

26 represents a double beveled gear adjustably secured near the center of the driving-shaft 9.

27 represents collars on the driving-shaft 9, which limit the inward movement of the sleeves 6.

28 represents hubs on the transverse frame 20.

29 represents vertical shafts journaled in the hubs 28, said shafts having beveled gears 30 on their lower ends, which mesh with the double beveled gear 26 on the operating-shaft, power being thus communicated to the shafts 29.

31 represents gears near the lower ends of the shafts 29, but above the beveled gears 30.

32 represents gears on the upper ends of the shafts 29.

33 represents arms, preferably of S shape, having their lower ends journaled at 34 to the shafts 29. The arms 33 have their hubs 34 at their lower ends resting on the upper ends of the hubs 28 of the transverse frame 20, said arms being free to swing upon the vertical shafts 29. The upper ends of the arms 33 are provided with hubs 35, the upper ends of said hubs 35 being formed into oil-cups 36.

37 represents shafts journaled near their lower ends in the hubs 35 and having gear-wheels 38 on their lower ends.

39 represents idler-gear wheels journaled at 40 on the arms 33. The idler-gears 39 form a connecting medium between the gear-wheels 32 and 38. The shafts 37 each extend through an orifice 41 in a plate 42 and have circular ironing-heads 43 on their upper ends. Each ironing-head 43 extends partly through an orifice 44 in the operating-table 15. Each head 43 is provided with a peripheral ironing-groove 45, the lower wall of said groove preferably extending in a horizontal direction and on line with the top of the table 15, the upper wall of the groove preferably being inclined upwardly and outwardly from the inner portion of the groove. Each head 43 is preferably provided with a flange 46, extending beneath the table 15 and closing up the lower end of the orifice 44.

47 represents a chamber on the under side of each head 43, into which heat is directed for heating the head to a proper condition for ironing the articles which pass through the machine. Above the plate 42 I secure a collar 48 to each ironing-shaft 37, said collars 48 being fixed to said shaft.

49 represents a collar resting on each collar 48, said collar 49 surrounding the shaft 37, but being loosely mounted thereon and resting upon the collar 48. On one side of the collar 49 I provide a chamber 50, having a contracted outlet 51 on the upper side of the collar 49.

52 represents a burner of any approved construction having apertures 53 for the introduction of air and having the inner end of said burner leading into the chamber 50 of the collar 49, as shown at 54.

55 represents a suitable pipe connecting with the outer end of the burner 52 for the introduction of gas or other heating medium to said burner. Combustion takes place at the mouth of the contracted orifice 51 in the collar 49 and the heat ascends into the chamber 47 of the circular ironing-head 43.

56 represents vertical shafts, one at each side of the machine and each journaled in one of the hubs 28 of the transverse frame 20 and having a gear-wheel 57 on its lower end, said wheel 57 meshing with the gear-wheel 31. The shaft 56 being thus driven, the arms 33, carrying the shaft 37, which operates the movable ironing-heads, are journaled in like manner to the shafts 56, as described in relation to the shafts 29, there being an intervening collar 59 between each of the hubs 34 and the shafts 56. Each shaft 56 also carries a gear-wheel 32, which meshes with an idler 39, which in turn meshes with the gear-wheel 38, as heretofore described. The shafts 56 rotate in their bearings, but have no side movement like the shafts 37, which are supported by the movable arms 33. Each shaft 56 extends up through an orifice 41 in the plate 42 and has the collars 48 49 mounted thereon in the same manner as on the shaft 37, the burner 52 being also located in connection with the collar, as heretofore described.

60 represents an enlarged head for ironing articles, said head being of substantially the same construction as the heads 43, with the addition that it is supplied with two extra ironing-grooves 61 62 and having a button 63 on its upper end. The head 60 extends up through an orifice 64 in a guide-plate 65, which is held by its own weight on the table 15.

66 represents weights mounted on the outer ends of arms 67, the inner ends of said arms 67 being rigidly connected with the hubs 34 of the movable arms 33. The ironing-heads 43 rotate within the orifices 44 in the table 15, said orifices being curved in form and being in duplicate on each side of the table, approaching toward each other toward the center of the table, but not meeting each other. The ironing-heads 43 are also in duplicate opposite each other and operating in said curved orifices. As the shafts 37, carrying the movable ironing-heads, are journaled to the swinging arms 33, any pressure on the inner faces of the ironing-heads 43 will have a tendency to force said ironing-heads outward in the curved orifices 44, and as the pressure is released said ironing-heads 43 will normally return to the inner lower ends of the orifices 44, said return of the movable ironing-heads 43 being caused by gravity occasioned by the tilting of the table into an inclined position, as shown in Fig. I, and also by the weights 66 returning to their lowest position. The action of the movable heads 43 is exemplified in Fig. II, said heads first coming in contact with the edge of the forward end of a collar or cuff, which is presented by the operator, the heads first ironing the edge of the forward end of the collar or cuff, and then as the article is fed between the first pair of the movable heads 43 they gradually travel backward in the curved orifices 44, the article meanwhile traveling forward and the ironing-heads ironing the outer edges or top and bottom of the collar or cuff, the collar or cuff proceeding to the next pair of heads, where the operation is repeated, the number of movable heads only being limited to the proper number to effectually iron the edges of the collar or cuff. I have shown but two pairs of movable ironing-heads, but do not desire to confine myself to any specific number. The action of the heads 43 will tend to carry the collar or cuff through between the ironing-heads without any auxiliary feeding device; but I have provided a series of feeding-rollers 68, mounted on shafts 69, said shafts 69 being in turn journaled to a U-shaped frame 70, which is rigidly connected at 71 to a sleeve 72, said sleeve 72 being supported by brackets 73, having their inner ends secured at 74 to the table 15. The guiding-plate 65 is provided with recesses 75, which correspond in shape with the curved orifices 44 in the top of the table in which the ironing-heads 43 operate. The tops of the heads 43 extend up into said recesses 75 in the guide-plate 65, as shown in Fig. III, thus permitting free action of the ironing-heads 43, while the guiding-plate acts as a cap covering said ironing-heads. The guide-plate 65 is also provided with a number of central apertures 76, through which the feed-rollers 68 extend down to a point sufficiently near the table 15 to catch the cuff or collar and carry it through between the movable ironing-heads, there being a series of feed-rollers, one passing the article on to the next. Said feed-rollers are provided with any suitable surface that will act to carry the article through the machine without affecting it in any way. I provide a number of perforations 77 in the guide-plate for the purpose of ventilation as the articles are passing through the machine.

78 represents a shoulder near the forward end of the guide-plate, which serves as a vertical transverse guide leading to the ironing-groove in the larger head 60. The forward end of the guide-plate 65 is curved upwardly, as shown at 79, in order to present a wider opening where the articles are fed into the machine. The guide-plate 65 is recessed in its central portion, and this portion of the plate is located a sufficient distance above the table 15 to permit free passage of the article being ironed. The recess in the central portion of the guide-plate provides a space 80, bounded by shoulders 78$^a$. When the operator inserts an article to be ironed between the shoulders 78$^a$, the edges thereof are directed into the grooves of the nearest ironing-heads 43 and at the same time the outward movement of the article is limited. If these guides were not provided, it might pass back behind the grooved heads. The frame 70, carrying the feed-rollers 68, is provided with a handle 81 at its inner end, so that it may be readily raised when found to be necessary.

82 represents a counterweight suitably secured on an arm 83, the opposite end of said arm being rigidly connected with the sleeve 72, said counterweight serving to hold the feed-rollers up from the table when it is desired to raise them. (See position indicated by dotted lines, Fig. I.)

84 represents an oil-tank having pipes 85 leading therefrom to the oil-cups 36 for lubricating the bearings. As the arms 33, which support the movable ironing-heads, move back and forth, the oil-cup 36 will at times not be in position to catch the lubricating-oil passing through the pipes 85, the oil at this time dropping down upon the gearing and being thrown to various points within the box. The box being tight, it is confined entirely within the same.

86 represents a valve or drain-cock at the lower end of the box 12 for draining the same of any accumulation of moisture. Power is transmitted from the power-shaft 9 by a belt 87, extending from the pulley 11 to a pulley 88 on one end of the shaft 72$^a$, passing through the sleeve 72. 89 is a pulley on the opposite end of the shaft 72$^a$, which is connected with a pulley 90 on one end of one of the shafts 69 by means of a belt 91. Power is transmitted to the remaining shafts 69 by any suitable means, such as a belt 92 traveling over pulleys 93 on said shafts.

94 represents a cuff being started into the machine and shows the positions the smaller ironing-heads assume as the cuff is fed lengthwise between the same. The larger ironing-head 60 may be used for finishing off any inequality in the article being ironed, and it may be used for ironing the edges of any starched article—such, for instance, as articles that would not pass between the smaller rollers, owing to their peculiar construction.

I have shown the vertical guide 78 on the bottom of the upper guide-plate 65, said vertical guide leading to the lower groove in the larger ironing-head 60. It is obvious that this vertical guide 78 might be on the table 15, or, in other words, on the lower guide, without altering the spirit of my invention, nor do I desire to be confined to the special form of vertical guide shown. It will also be noticed that one pair of the smaller ironing-heads 43 also serve as guides, one pair of ironing-heads guiding the article being ironed to the next pair of ironing-heads, and as said ironing-heads are grooved, and as the article passes between the heads in said grooves, said heads serve as both vertical and horizontal guides to the article being ironed, thus limiting the side movement of the article, as well as the up-and-down movement, irrespective of the table and the upper guide.

Having thus described my invention, the following is what I claim as new therein and desire to secure by Letters Patent:

1. In a machine for ironing the edges of collars and cuffs, the combination with feed mechanism to move a collar or cuff along a given path, of ironing devices disposed in the path of the collar or cuff, and adapted to normally gravitate thereto and hence adjust themselves laterally to the width thereof, substantially as described.

2. An ironing-machine comprising two or more grooved circular heads adapted to iron the edge of a starched collar or cuff, and yielding supports for the heads whereby the latter are permitted to follow the outline of said edge as the article bears thereon; substantially as described.

3. An ironing-machine comprising a series of grooved circular heads adapted to iron the edge of a starched collar or cuff, and swinging supports in which the heads are journaled and whereby the latter are permitted to follow the outline of said edge as the article bears thereon; substantially as described.

4. An ironing-machine, comprising a table, a yielding support, a rotating head having a circumferential groove for receiving the edge of the article to be ironed and mounted in the yielding support, and a guide directing the edge of the article into the groove of the head; substantially as described.

5. An ironing-machine, comprising a table, oppositely-acting yielding supports, rotating heads each having a circumferential groove for receiving the edge of the article to be ironed and mounted in the yielding supports, and guides directing the edge of the article into the grooves of the heads; substantially as described.

6. An ironing-machine, comprising a table, oppositely-acting yielding supports, rotating heads each having a circumferential groove for receiving the edge of the article to be ironed and mounted in the yielding supports, a grooved ironing-head having a fixed support and a guide-plate having transverse and longitudinal shoulders providing guides for directing the article into the grooves of the heads adjacent thereto; substantially as described.

7. In an ironing-machine the combination of a suitable support, and a series of grooved ironing-heads arranged substantially opposite each other, said heads being adapted to move outwardly while an article being ironed is passing between the heads, substantially as set forth.

8. In an ironing-machine the combination of a suitable support, and a series of grooved ironing-heads arranged substantially opposite each other and adapted to move independently of each other from pressure received by contact of the article being ironed, substantially as set forth.

9. In an ironing-machine the combination of a suitable support, and a series of movable grooved ironing-heads arranged in substantially two parallel lines, said heads being adapted to move outwardly from the pressure of the article being ironed passing between the heads, substantially as set forth.

10. In an ironing-machine the combination of a suitable support, a box or frame pivoted to said support whereby it may be inclined at an angle, and a series of oppositely-arranged ironing-heads having a movable support whereby the action of an article passing between the heads causes them to recede, said heads returning by gravity to their inner normal position when the article being ironed has passed out of contact with the heads, substantially as set forth.

11. In an ironing-machine the combination of a suitable support, a box or frame pivoted to said support, a series of oppositely-opposed rotating heads movably connected with said support and adapted to recede from pressure of the article being ironed and feed-rollers for carrying the article being ironed located between the ironing-heads, substantially as set forth.

12. In an ironing-machine the combination of a suitable support, a series of movably-supported ironing-heads, swinging frames in which the heads rotate, means for rotating said ironing-heads and means for feeding an article to be ironed located between said ironing-heads, substantially as set forth.

13. In an ironing-machine the combination of a suitable support, movable ironing-heads pivoted in said support and adapted to yield from pressure, a hinged frame connected with the support and a series of feed-rollers journaled to said hinged frame and operating between the heads, substantially as set forth.

14. In an ironing-machine the combination of a suitable support, a series of pivoted ironing-heads, a frame hinged to the support, feed-rollers journaled to the frame and operating between the heads and a counterweight for holding said frame and feed-rollers in a raised position, substantially as set forth.

15. In an ironing-machine the combination of a suitable support, an operating-shaft, gear-wheels on the operating-shaft, a series of vertical shafts having gears thereon for transmitting power, swinging arms pivoted to said vertical shafts, grooved ironing-heads mounted on shafts that are journaled to the upper ends of said arms, gears on the lower end of the shafts which support the ironing-heads, and an idler-gearing supported by the arms and connecting the shafts of the ironing-heads with the vertical power-transmitting shafts, substantially as set forth.

16. In an ironing-machine the combination of a suitable support, a box movably pivoted to said support, an operating-shaft journaled in said box and having power-transmitting gear-wheels, a transverse frame having hubs thereon, vertical shafts pivoted in said hubs and having gear-wheels on their upper and lower ends, swinging arms having their lower ends pivoted on said vertical shafts, ironing-heads, shafts for supporting said ironing-heads and suitable gearing mechanism connecting the ironing-head shafts with the vertical shafts, and weights connected with said arms for returning the ironing-heads to their normal position, substantially as set forth.

17. In an ironing-machine the combination with ironing-heads mounted on shafts, of swinging supports for said shafts, and an ironing-table having curved orifices in which the ironing-heads operate, substantially as set forth.

18. In an ironing-machine the combination of suitable ironing-heads, swinging frames for movably supporting said ironing-heads, an ironing-table having curved orifices therein in which the ironing-heads operate and flanges on the lower ends of the ironing-heads for closing the lower portion of said curved orifices, substantially as set forth.

19. In an ironing-machine the combination of a suitable support, ironing-heads mounted on shafts, means for rotating said shafts, supporting-collars secured to said ironing-head shafts, collars resting on said supporting-collars and loosely connected with the ironing-head shafts, contracted orifices in said collars, chambers in the collars with which the contracted orifices connect and burners connected with said chambers thereby forming a medium for heating the ironing-heads, substantially as set forth.

20. In an ironing-machine the combination of a suitable support a series of S-shaped arms movably supported in the ironing-machine, a series of ironing-heads mounted on shafts, said shafts being journaled in said S-shaped arms an inclined table and weights connected with said arms, substantially as set forth.

21. In an ironing-machine the combination of a suitable support, grooved ironing-heads, means for supporting said ironing-heads, an ironing-table serving as a guide to said grooved heads and an upper guide located over said grooved heads and forming an upper guide for the article being ironed, substantially as set forth.

22. An ironing-machine, comprising a table, oppositely-acting yielding supports, rotating heads each having a circumferential groove for receiving the edge of the article to be ironed and mounted in the yielding supports, and a guide-plate having longitudinal shoulders and an upwardly-curved front end providing in connection with the table a double guide for the article passing into the grooves of the heads; substantially as described.

23. In an ironing-machine the combination of grooved ironing-heads, a table through which the heads partially extend and which serves as a lower guide for the article being ironed, and an upper guide having recesses on its under side into which the ironing-heads extend, said upper guide having its forward end curved upwardly for the ready admission of the article being ironed, substantially as set forth.

24. In an ironing-machine the combination of grooved ironing-heads, a table forming a lower guide leading to said ironing-heads, and an upper guide placed over said ironing-heads and perforations extending through the upper guide, substantially as set forth.

25. In an ironing-machine the combination of a suitable support, grooved ironing-heads, a table forming a lower guide, an upper guide placed over the heads and a shoulder located near the forward end of the upper guide for forming a vertical guide, substantially as set forth.

26. In an ironing-machine the combination of a suitable supporting mechanism, a grooved ironing-head adapted to iron the edges of starched articles and a vertical guide to the groove in the ironing-head.

27. In an ironing-machine the combination of a rotatable ironing-head having a peripheral groove for ironing the edges of starched articles and a detachable vertical guide to said groove.

28. In an ironing-machine the combination of a circular ironing-head having a peripheral groove adapted to iron the edges of starched articles, and a guide-plate having a shoulder forming a vertical guide to the groove in the head, and a recess into which the head extends.

29. In an ironing-machine the combination of a circular ironing-head having a yielding support, and a peripheral groove adapted to iron the edges of starched articles, and a guide-plate having a shoulder forming a vertical guide to the groove in the head, and a recess into which said head extends and into which it recedes from pressure of the article being ironed.

30. In an ironing-machine the combination of a suitable support, grooved ironing-heads having a movable support, an enlarged ironing-head having a fixed support, said enlarged ironing-head having a groove therein and guides leading to the ironing-grooves in said heads, substantially as set forth.

31. An ironing-machine having a grooved ironing-head and a guide-plate formed with a vertical wall or shoulder adapted to guide an article being ironed into the groove of the head, substantially as set forth.

32. In an ironing-machine the combination of a suitable support, a grooved ironing-head, means for rotating said ironing-head and a guide-plate formed with a vertical wall or shoulder leading to said head, substantially as set forth.

33. In an ironing-machine the combination of a series of movably-supported grooved ironing-heads adapted to adjust themselves to the size of an article being ironed, said grooved heads forming a combined vertical and horizontal guide for guiding the article being ironed, substantially as set forth.

34. The combination of a slotted table, swinging arms pivotally supported below said table, and work-treating rolls revolubly mounted on the arms and protruding through the slots of the table, said rolls being adjustable with the arms and sustained thereby in parallel relation to each other at all points of their adjustment; substantially as described.

35. The combination of the pivoted arms, work-treating rolls journaled on said arms for adjustment therewith and maintained thereby in parallel relation, and driving devices concentric with the axes of adjustment of said arms and connected operatively with the rolls, whereby said rolls may be positively driven at all points of their adjustment, substantially as described.

36. The combination of arbors, swinging arms pivotally supported on said arbors, work-treating rolls revolubly journaled on the arms, gear elements mounted on the arbors in concentric relation to the axes of adjustment of the arms and said rolls, and gear connections between said rolls and the gear elements on the arbors; substantially as described.

37. The combination of a slotted table, swinging arms pivotally supported below said table, a pair of coacting ironing-rolls journaled on said arms and extending through the slots in the table, said rolls provided with coincident annular grooves that lie contiguous to the surface of the table, and means for heating said rolls; substantially as described.

The foregoing specification signed at Los Angeles, California, this 8th day of December, 1897.

FRED E. FAY.

In presence of—
J. W. KEMP,
J. E. KNIGHT.